(12) United States Patent
Voyer et al.

(10) Patent No.: US 8,660,579 B2
(45) Date of Patent: Feb. 25, 2014

(54) METHOD AND A DEVICE FOR ENABLING A MOBILE TERMINAL TO BE DETECTED BY AT LEAST ONE BASE STATION

(71) Applicants: Nicolas Voyer, Rennes Cedex (FR); Herve Bonneville, Rennes Cedex (FR)

(72) Inventors: Nicolas Voyer, Rennes Cedex (FR); Herve Bonneville, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/725,363

(22) Filed: Dec. 21, 2012

(65) Prior Publication Data

US 2013/0109383 A1 May 2, 2013

Related U.S. Application Data

(62) Division of application No. 12/808,873, filed as application No. PCT/EP2008/002116 on Mar. 17, 2008.

(30) Foreign Application Priority Data

Dec. 20, 2007 (EP) ..................................... 07024729

(51) Int. Cl.
*H04W 4/00* (2009.01)
*H04B 7/00* (2006.01)
*H04W 24/00* (2009.01)

(52) U.S. Cl.
USPC .................. 455/456.1; 455/422.1; 455/522; 455/456.5

(58) Field of Classification Search
USPC .............. 455/422.1, 436–444, 462, 465, 522, 455/63.1, 296, 456.1, 456.5; 370/328, 331, 370/338
See application file for complete search history.

(56) References Cited

U.S. PATENT DOCUMENTS

| | | | |
|---|---|---|---|
| 2004/0097260 A1* | 5/2004 | Stenton et al. ............. | 455/552.1 |
| 2006/0121916 A1 | 6/2006 | Aborn et al. | |
| 2006/0187858 A1 | 8/2006 | Kenichi et al. | |
| 2006/0217147 A1 | 9/2006 | Olvera-Hernandez et al. | |
| 2007/0060130 A1 | 3/2007 | Gogic et al. | |
| 2008/0227463 A1* | 9/2008 | Hizume et al. ............. | 455/456.1 |
| 2008/0298275 A1 | 12/2008 | De Sousa | |
| 2009/0163216 A1 | 6/2009 | Hoang et al. | |
| 2010/0093351 A1 | 4/2010 | Barrett et al. | |
| 2010/0113035 A1 | 5/2010 | Eskicioglu et al. | |

FOREIGN PATENT DOCUMENTS

| | | |
|---|---|---|
| WO | 2006 061670 | 6/2006 |
| WO | 2006 078627 | 7/2006 |

OTHER PUBLICATIONS

Mitsubishi, 3GPP TSG RAN WG3 Meeting #61, Aug. 2008.*

* cited by examiner

*Primary Examiner* — Wesley Kim
(74) *Attorney, Agent, or Firm* — Oblon, Spivak, McClelland, Maier & Neustadt, L.L.P.

(57) ABSTRACT

A method and associated device for enabling a mobile terminal to be detected by a first base station of a wireless cellular telecommunication network. The method receives from the mobile terminal a message comprising information representative of the location of the mobile terminal in the geographical area of the first base station, and transfers a predetermined signal if the location of the mobile terminal is comprised in a geographical area of the first base station, the predetermined signal being representative of a request to the first base station to start to transfer signals in the cell of the first base station.

20 Claims, 7 Drawing Sheets

METHOD AND A DEVICE FOR ENABLING A MOBILE TERMINAL TO BE DETECTED BY AT LEAST ONE BASE STATION

This application is a division of and is based upon and claims the benefit of priority under 35 U.S.C. §120 for U.S. Ser. No. 12/808,873, filed Jun. 17, 2010, the entire contents of each of which are incorporated herein by reference, which is a National Stage of PCT/EP08/002,116, filed Mar. 17, 2008, and claims the benefit of priority under 35 U.S.C. §119 from European Patent Application No. 07024729.1, filed Dec. 20, 2007.

The present invention relates to a method and a device for enabling a mobile terminal to be detected by at least one base station.

Classical wireless cellular telecommunication networks provide coverage of wireless services in wide areas. Macro-cells are used to pave the coverage area of the wireless cellular telecommunication network.

A macro-cell has a coverage area of around ten $km^2$.

Each cell is controlled by one base station, which has to be connected to each base station controlling a neighbour cell of the cell.

At the setup of a base station, the base station configures the radio interface, the network interface, i.e. configures the connexion links with neighbour base stations and servers and starts transmitting on a broadcast channel, together with pilot signals and so on. The mobile terminal, which is located in the cell managed by the base station, can make measurements on signals transmitted by surrounding base stations so as to prepare/trigger a handover from the base station which is currently managing the cell in which the mobile terminal is located to another cell managed by one of the surrounding base stations.

When numerous macro-cells are deployed within an area, each cell should be configured with a different cell identifier, and the radio resource of each macro-cell should be configured so as to minimise interference produced by other macro-cells.

The configuration of the connection links, identifiers allocation and interferences problems are important points to be considered and solved in classical wireless cellular telecommunication networks.

When the wireless cellular telecommunication networks also comprise micro-cells which have a reduced coverage area of around 0.1 $km^2$, the number of neighbour cells of a macro-cell increases. The problems generated by the increase of the number of connection links, of identifiers and interferences problems increase.

Aforementioned problems become more important with cells having lower coverage areas like pico-cells or femto-cells. It has been proposed to extend the coverage of Public Land Mobile Networks or (PLMN) wireless cellular telecommunication networks with pico-cells and femto-cells. A pico-cell has a coverage area of around few thousands $m^2$, while a femto-cell has a coverage area of around hundred $m^2$. As for macro and micro-cells, each base station which manages one pico or femto-cell has to be connected to each base station controlling a neighbour cell of the pico or femto-cell.

Base stations managing pico or femto cells are classically set up within home or offices. They enable a restricted number of mobile terminals to use their resources in order to access to the wireless cellular telecommunication network. The base stations managing pico or femto are associated to these allowed mobile terminals as they allow these mobile terminals to use their resources in order to access to the wireless cellular telecommunication network.

When numerous pico or femto-cells are deployed over an area widely covered by a macro-cell, each pico or femto-cell should be configured with a different cell identifier, and the radio resource of each pico or femto-cell should be configured so as to minimise interference produced by other pico or femto-cells. Radio resource has to be split over pico or femto-cells, each pico or femto-cell getting reduced capacity.

When numerous pico or femto-cells are deployed, the micro or macro-cell should be configured to support a large number of neighbour cells. Mobile terminals in micro-cell should scan all possible neighbour cells. This process is long and battery consuming.

According to prior art, when a pico or femto-cell is setup, it should be connected to a server and to the other base stations that manage other neighbour cells. When numerous pico or femto-cells are setup, the server and the other base stations should maintain a high number of communication links between each other, even though there is no traffic activity on each communication link. This consumes memory and processing capabilities of the server as well as of the base stations.

As it has been disclosed for macro and micro cells, when a pico or femto-cell is setup, the base station which manages the pico or femto-cell should transmit pilot signals so as to let mobile terminals prepare any handover. This produces interference to other cells. Interference generated by huge number of pico-cells and femto-cells to micro-cells or macro-cells can be significant and reduce the quality of the downlink channel of the macro and micro-cells.

The aim of the invention is therefore to propose a method and a device which intend to reduce the interference problems in a wireless cellular telecommunication network.

The present invention aims also at reducing the transmission of signals in the wireless cellular telecommunication network.

To that end, the present invention concerns a method for enabling a mobile terminal to be detected by a first base station of a wireless cellular telecommunication network characterized in that the method comprises the steps of:

obtaining information representative of the location of the mobile terminal, transferring a predetermined signal if the location of the mobile terminal is comprised in a geographical area of the first base station, the predetermined signal being representative of a request to the first base station to transfer signals in the cell of the first base station.

The present invention concerns also a device for enabling a mobile terminal to be detected by a first base station of a wireless cellular telecommunication network, characterized in that the device comprises:

means for obtaining information representative of the location of the mobile terminal, means for transferring a predetermined signal if the location of the mobile terminal is comprised in a geographical area of the first base station, the predetermined signal being representative of a request to the first base station to transfer signals in the cell of the first base station.

Thus, the interference problems are reduced in the wireless cellular telecommunication network.

Furthermore, the present invention reduces the transmission of signals in the wireless cellular telecommunication network.

According to a particular feature, the first base station is associated to the mobile terminal.

According to a particular feature, the wireless cellular telecommunication network comprises a server, the present invention is executed by the server and the server establishes a communication link with the first base station and the predetermined signal is a message transferred by the server to the first base station requesting the first base station to transfer signals in the cell of the first base station.

Thus, as the method is executed by a device centralizing information like a server, the location of the mobile terminal and its comparison with the geographical area of the first base station associated to the mobile terminal can be made using many different information.

Furthermore, the method is transparent for the mobile terminal, and can be applied for any kind of mobile terminal. Especially, no base station can be activated without the server consent, which keeps full control of base station activation.

By establishing the communication link only when the location of the mobile terminal is comprised in the geographical area of the first base station associated to the mobile terminal, the number of communication links is reduced.

According to a particular feature, the information representative of the location of the mobile terminal is obtained by the server from a message generated by the mobile terminal and received by the server.

Thus, the mobile terminal location is easily obtained by the server, and the server can take benefit from location capabilities of the mobile terminal.

According to a particular feature, the information representative of the location of the mobile terminal is obtained by the server from information identifying a second base station which manages a cell in which the mobile terminal is located.

Thus, the determination of the location area of the mobile terminal is simple and the mobile terminal requires no location determination module. As the server is aware of the location of the base stations and in which cell the mobile terminal is located, it is possible to deduce the location of the mobile terminal from these data.

According to a particular feature, the wireless cellular telecommunication network comprises plural base stations and the server:
  maintains a data base comprising, for each mobile terminal, information indicating each first base station associated to the mobile terminal, and for each first base station associated to the mobile terminal, a geographical area,
  identifies, from information representative of the location of the mobile terminal and from the geographical area of each first base station associated to the mobile terminal, at least one first base station to which, the predetermined signal representative of a request to transfer signals in the cell of the first base station, has to be transferred.

Thus, the server keeps the control of the transfer of the request to the base station to transfer signals in the cell of the base station.

According to a particular feature, the wireless cellular telecommunication network comprises a second base station which manages a cell in which the mobile terminal is located and the method is executed by the second base station.

Thus, the server load is decreased since the server has not to track the location of each terminal.

According to a particular feature, the information representative of the location of the mobile terminal is obtained by the second base station from a message generated by the mobile terminal and received by the second base station.

According to a particular feature, prior to the transfer of the predetermined signal to the first base station, the second base station establishes a communication link between the first base station and the second base station.

According to a particular feature, the present invention is executed by the mobile terminal.

Thus, the server load is decreased since the server has not to track the location of each terminal.

According to a particular feature, the predetermined signal is a predetermined signature transferred to the first base station, that is modulated in a frequency band different than the frequency band used for the transmission of message from the mobile terminal to the first base station.

Thus, the predetermined signal does not interfere the uplink messages of the wireless cellular communication system. A predetermined secret signature can be used so as to restrict the activation of the base station to a limited subset of mobile terminals of the wireless cellular communication system, which share the secret predetermined signature.

According to a particular feature, the predetermined signal is transferred to the first base station and is a predetermined encoded train of energy pulses that are propagated by radio or optical waves.

Thus, the predetermined signal is hard to intercept by malicious third parties, and the predetermined signal can be kept secret and restricted to a limited subset of mobile terminals of the wireless cellular communication system, which share the secret predetermined signature.

Furthermore, the power consumption for transmitting the predetermined signal is limited.

According to a particular feature, the wireless cellular telecommunication network comprises a server and in that the predetermined signal is a message transferred by the mobile terminal to the server.

Thus the mobile terminal does not need additional means to transfer the predetermined signal. The complexity of the mobile terminal is limited.

According to a particular feature, the wireless cellular telecommunication network comprises plural base stations and the mobile terminal maintains a data base information indicating, for each first base station associated to the mobile terminal, a geographical area.

Thus, the mobile terminal can decide if the predetermined signal needs to be transferred without needing actions from the network side. The server load is decreased.

According to a particular feature, the message sent to the server by the mobile terminal comprises information representative of the location of the mobile terminal.

Thus, the mobile terminal location is easily obtained by the server, and the server can take benefit from location capabilities of the mobile terminal.

According to a particular feature, the message sent to the server comprises at least one identifier of a first base station associated to the mobile terminal.

Thus, the base station server can easily determine which base stations are requested to transfer signals in the cells they manage.

According to a particular feature, the information representative of the location of the mobile terminal is obtained from a Global Navigation Satellite System.

According to a particular feature, the information representative of the location of the mobile terminal is obtained from at least one identifier of at least one base station of the wireless cellular telecommunication network.

Thus, the mobile terminal does not need to comprise dedicated circuits for the determination of the information representative of the location of the mobile terminal.

According to a particular feature, the geographical area of one first base station associated to the mobile terminal is updated by memorizing information representative of the location of the mobile terminal in cells of other base stations of the wireless cellular telecommunication network, the other base stations being base stations with which cell reselection or handover procedure has been executed by the mobile terminal from or to the cell of the other base stations.

Thus, the mobile terminal can update the area associated to the first base station without needing external configuration, reducing network burden. Furthermore, the area is updated with geographical information representative of actual radio conditions. The predetermined signal is transferred only when needed.

According to a particular feature, the location of the mobile terminal is time stamped and the location of the mobile terminal is used to update the geographical area of one first base station associated to the mobile terminal if the location of mobile terminal is enough recent at the time the cell selection or the handover procedure is executed by the mobile terminal from or to the cell of the first base station.

Thus, the geographical area associated to the base station can be updated even if the mobile terminal lacks of location coverage around the base station.

According to a particular feature, the wireless cellular telecommunication comprises a proxy through which the predetermined signal is transferred to the first base station by the server or by the base station which manages the cell in which the mobile terminal is located.

According to still another aspect, the present invention concerns a computer program which can be directly loadable into a programmable device, comprising instructions or portions of code for implementing the steps of the method according to the invention, when said computer program is executed on a programmable device.

Since the features and advantages related to the computer program are the same as those set out above related to the method and device according to the invention, they will not be repeated here.

The characteristics of the invention will emerge more clearly from a reading of the following description of an example embodiment, the said description being produced with reference to the accompanying drawings, among which:

In the cellular telecommunication network, a server 10 is able to be connected to a plurality of base stations BS1 to BS5 through a telecommunication network. The telecommunication network is a dedicated wired network or a public network like a public switched network or an IP based network or a wireless network or an Asynchronous Transfer Mode network or a combination of above cited networks.

The telecommunication network enables the base stations BS1 to BS5 to be connected together if needed and enables the transfer of messages and of information between the base stations BS1 to BS5 or between the base stations BS1 to BS5 and the server 10 according to the present invention.

Each base station BS1 to BS5 is able to transfer and/or receive signals or messages through at least one wireless area 15. Such wireless area 15 will be called hereinafter a cell 15 managed by the base station BS or the cell 15 of the base station BS. The cells 15 are macro-cells and/or micro-cells and/or pico-cells and/or femto-cells.

Figure 1A:
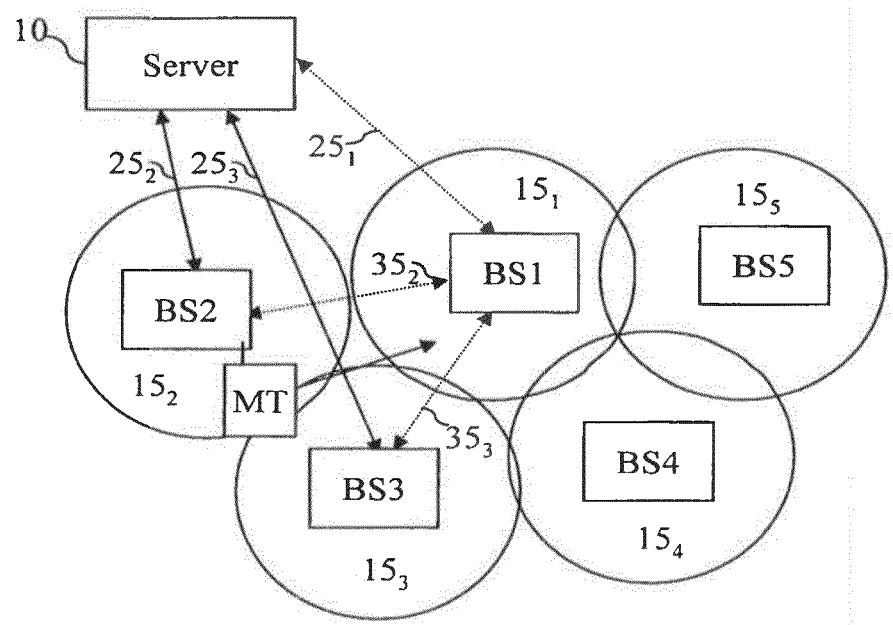
FIG. 1a is a diagram representing the architecture of a first example of a wireless cellular telecommunication network in which the present invention is implemented.

According to the example of the FIG. 1a, the base station BS1 manages the cells $15_1$, the base station BS2 manages the cells $15_2$, the base station BS3 manages the cells $15_3$, the base station BS4 manages the cells $15_4$ and the base station BS5 manages the cells $15_5$.

The base stations BS manage the mobile terminals MT which are located in the cell 15 they respectively manage.

A mobile terminal MT is managed by a base station BS when it can receive or establish a communication with a remote telecommunication device not shown in the FIG. 1a.

The server 10 stores the information related to the base stations BS1 to BS5 of the cellular telecommunication network. For each base station BS1 to BS5, the server 10 stores information representative of the base stations BS which manage cells 15 which are neighbour of the cell 15 managed by the base station BS. The server 10 maintains the list of the base stations BS which are currently active, i.e. the base stations BS which transfer signals in their respective cells 15. The server 10 also maintains other parameters of inactive base stations BS like the base stations BS4 and BS5. The other parameters include connection and security information, such as IP address, TCP or SCTP ports, cipher keys, that enable quick setup of link between inactive base station BS and the server 10 when the inactive base stations BS become active.

The server 10 may also store a geographical area of each base station BS. A geographical area of a base station BS is an area surrounding the base station BS.

The server 10 may also store information indicating if a base station BS is associated to a mobile terminal MT.

A base station BS and a mobile terminal MT are associated as example when there is a relationship between the base station BS and the terminal MT.

The relationship is as example, the fact that the base station BS and the mobile terminal MT belong to the same holder or the base station BS belongs to a network operator with which the holder of the mobile terminal MT has contracted a service or the holder of the base station BS authorizes the mobile terminal MT to use the resources of the base station BS.

The server 10 may also maintain a data base comprising, for each mobile terminal MT, information indicating each base station BS associated to the mobile terminal MT, and for each base station BS associated to the mobile terminal MT, a geographical area.

The server 10 may also identify, from information representative of the location of the mobile terminal MT and from the geographical area of each base station BS associated to the mobile terminal MT, at least one base station BS to which, the predetermined signal representative of a request to transfer signals in the cell 15 of the base station 15, has to be transferred.

In the FIG. 1a, only one server 10 is shown, but we can understand that a more important number of servers 10 can be used in the present invention.

On a similar way, only five base stations BS1 to BS5 and their respective cells $15_1$ to $15_5$ are shown, but we can understand that a more important number of base stations BS and cells 15 are used in the present invention.

In Long Term Evolution (LTE) network currently under discussion in 3GPP, the server 10 is named a Mobility Management Entity (MME). In General Packet Radio Service network, the server 10 is named a Serving GPRS Support Node (SGSN). In mobile IP network, the server 10 is named a Foreign Agent (FA) and in GSM network, the server 10 is named a Visitor Location Register (VLR).

In the FIG. 1a, a mobile terminal MT is shown. The mobile terminal MT is located in the cell $15_2$ of the base station BS2 and is moving into the cell $15_1$ of the base station BS1.

Only one mobile terminal MT is shown in the FIG. 1a, but we can understand that a more important number of mobile terminals MT are in the wireless cellular telecommunication network.

When the mobile terminal MT is located in a cell 15, the mobile terminal MT can establish or receive or continue a communication through the base station BS which manages the cell 15 in which mobile terminal MT is located or can receive a paging notification message.

The server 10 is in charge of keeping track of the location of the mobile terminal MT in the wireless cellular telecommunication network, so as to be able to route paging notifications to the base stations BS which control at least a cell 15 in which the mobile terminal MT is expected to be located in. The group of cells, in which the mobile terminal MT is expected to be located in, is named a Tracking Area. Such paging notification can occur at various occasions, but mainly at the time that an incoming call has to be routed from the network down to the mobile terminal MT. Then, the base station BS can send over the radio, a paging notification message that the mobile terminal MT can listen to. Once the mobile terminal MT has received the paging message, it can wake up and trigger signalling so as to accept the call.

Each base station BS may transfer in each cell 15 it manages, a monitoring list comprising information identifying other cells 15. The mobile terminal MT monitors the signals transferred in these cells 15 and sends measurement reports to the base station BS which manages the cell 15 in which the mobile terminal MT is located.

For example, when the mobile terminal MT is in communication with a remote telecommunication device not shown in the FIG. 1a through a base station BS, that base station BS or the server 10 can decide, according to the measurement report, to proceed to a handover procedure of the communication, i.e. enabling the continuation of the communication through another base station BS.

The base stations BS2 and BS3 are linked to the server 10 through communication links noted $25_2$ and $25_3$ in the FIG. 1a.

When the base station BS doesn't detect any signal transferred by mobile terminals MT, or when the signals detected by the base station BS have a power level below a predetermined value, the base station BS enters in a non active mode wherein the base station BS stops to transfer signals in the cell 15 it manages. When the base station BS receives a predetermined signal, the base station BS starts to transfer signals in the cell 15 it manages.

According to the first mode of realization of the present invention, the predetermined signal is a message transferred by the server 10.

According to the second mode of realization of the present invention, the predetermined signal is a message transferred by a base station BS, like the base station BS which is currently managing the mobile terminal MT.

In a variant, the message is a predetermined signal transferred by the mobile terminal MT.

The predetermined signal is transferred by the mobile terminal MT or the server 10 or the base station BS which manages the mobile terminal MT if the location of the mobile terminal MT is comprised in a geographical area of the base station BS associated to the mobile terminal MT.

The mobile terminal MT may maintain a data base information indicating, for each base station BS associated to the mobile terminal MT, a geographical area.

The geographical area of one base station BS associated to the mobile terminal MT may be updated by memorizing information representative of the location of the mobile terminal MT in cells 15 of other base stations BS of the wireless cellular telecommunication network, the other base stations BS being base stations BS with which cell reselection or handover procedure has been executed by the mobile terminal MT from or to the cell 15 of the base station BS.

Once the base station BS1 receives the predetermined signal from the mobile terminal MT, the base station BS1 establishes a communication link noted $25_1$ in the FIG. 1a between the base station BS1 and the server 10. When the predetermined signal is transferred by the server 10, the server 10, prior to the transfer of the signal, establishes a communication link noted $25_1$ in the FIG. 1a between the base station BS1 and the server 10. When the predetermined signal is transferred by the base station BS which manages the mobile terminal MT, the base station BS which manages the mobile terminal MT, prior to the transfer of the signal, establishes a communication link between the base station BS1 and the base station BS which manages the mobile terminal MT. Then, the base station BS1 establishes a communication link noted $25_1$ in the FIG. 1a between the base station BS1 and the server 10. When the communication link $25_1$ is established, the base station BS1 obtains from the server 10, the list of active base stations BS2 and BS3 which manage cells 15 which are neighbour of the cell $15_1$ of the base station BS1, and/or establishes communication links noted $35_2$ and $35_3$ in the FIG. 1a between the base station BS1 and the base stations BS2 and BS3, and starts the transmission of signals in the cell $15_1$.

Figure 1B:
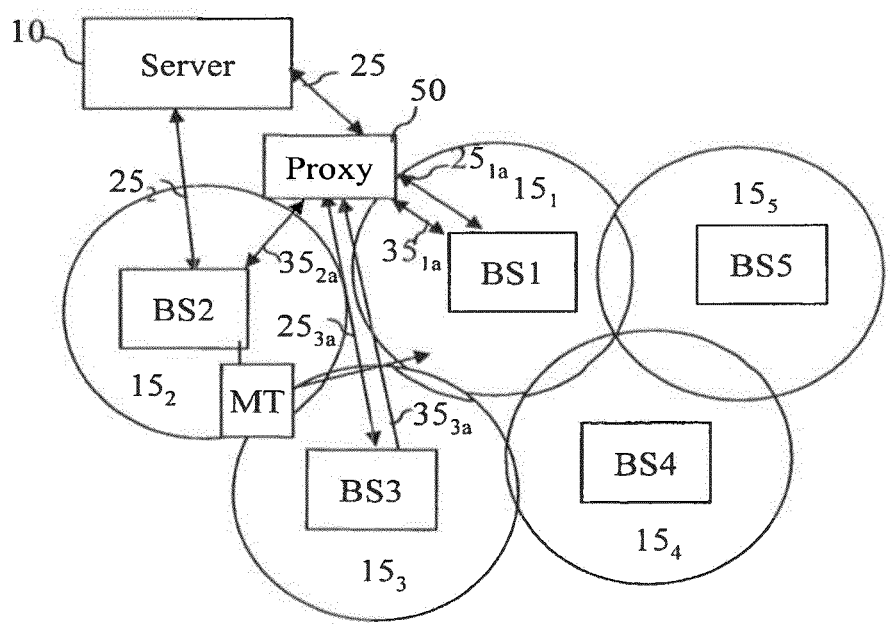
FIG. 1b is a diagram representing the architecture of a second example of a wireless cellular telecommunication network in which the present invention is implemented.

FIG. 1b is a diagram representing the architecture of a second example of a wireless cellular telecommunication network in which the present invention is implemented.

The second example of a wireless cellular telecommunication network is different from the first example in the sense that a proxy 50 is connected between some of the base stations BS and between some of the base stations BS and the server 10.

A proxy 50 is a device which receives messages addressed to a destination and which forwards the received messages to the destination.

The proxy 50 and the base stations BS1 and BS3 to BS5 are recognized by the server 10 as a unique base station BS which has plural cells 15.

According to the second example, the base station BS1 is linked to the server 10 through the proxy 50 and the communication links noted 25 and $25_{1a}$ in the FIG. 1b. The base station BS2 is directly linked to the server 10 through the communication link noted $25_2$ in the FIG. 1b. The base station BS3 is linked to the server 10 through the proxy 50 and the communication links noted $25_{3a}$ and 25 in the FIG. 1b.

When a base station BS doesn't detect any signal transferred by mobile terminals MT, or when the signals detected by the base station BS have a power level below a predetermined value, the base station BS enters in a non active mode wherein the base station BS stops to transfer signals in the cell 15 it manages and wherein the links between the base station BS and the proxy 50 are released.

When the base station BS1 enters in a non active mode, the link $25_{1a}$ is released by the base station BS1 and/or by the proxy 50.

When the base station BS3 enters in a non active mode, the link $25_{3a}$ is released by the base station BS1 and/or by the proxy 50.

When the base station BS1 receives a predetermined signal, the base station BS1 starts to transfer signals in the cell 15 it manages. When the predetermined signal is received from the mobile terminal MT according to the variant, the base station BS1 commands the establishment of the link $25_{1a}$ with the proxy 50. When the predetermined signal is a message transferred by the server 10 according to the first mode of realisation or transferred by a base station BS according to the second mode of realisation, the proxy 50 commands the establishment of the link $25_{1a}$ with the base station BS1.

When the base station BS3 receives a predetermined signal, the base station BS3 starts to transfer signals in the cell 15 it manages. When the predetermined signal is received from the mobile terminal MT according to the variant, the base station BS1 commands the establishment of the link $25_{3a}$ with the proxy 50. When the predetermined signal is a message transferred by the server 10 according to the first mode of realisation or transferred by a base station BS according to the second mode of realisation, the proxy 50 commands the establishment of the link $25_{3a}$ with the base station BS3.

The mobile terminal MT may maintain a data base information indicating, for each base station BS associated to the mobile terminal MT, a geographical area.

The geographical area of one base station BS associated to the mobile terminal MT may be updated by memorizing information representative of the location of the mobile terminal MT in cells 15 of other base stations BS of the wireless cellular telecommunication network, the other base stations BS being base stations BS with which cell reselection or handover procedure has been executed by the mobile terminal MT from or to the cell 15 of the base station BS.

Once the communication link noted $25_{1a}$ is established, the base station BS1 obtains from the server 10, the list of active base stations BS2 and BS3 which manage cells 15 which are neighbour of the cell $15_1$ of the base station BS1, and/or establishes communication links noted $35_{2a}$ and $35_{3a}$ in the FIG. 1b between the base station BS1 and the base stations BS2 and BS3 through the proxy 50, and starts the transmission of signals in the cell $15_1$.

Figure 2:
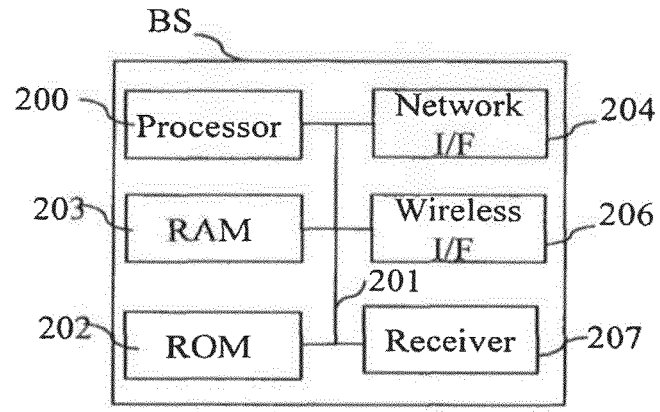
FIG. 2 is a block diagram of a base station according to the present invention.

FIG. 2 is a block diagram of a base station device according to the present invention.

Each base station BS has, for example, an architecture based on components connected together by a bus 201 and a processor 200 controlled by the program as disclosed in the FIGS. 4a and 4b.

The bus 201 links the processor 200 to a read only memory ROM 202, a random access memory RAM 203, a network interface 204, a wireless interface 206 and, according to a variant of realisation, a wireless receiver 207.

Figure 8:
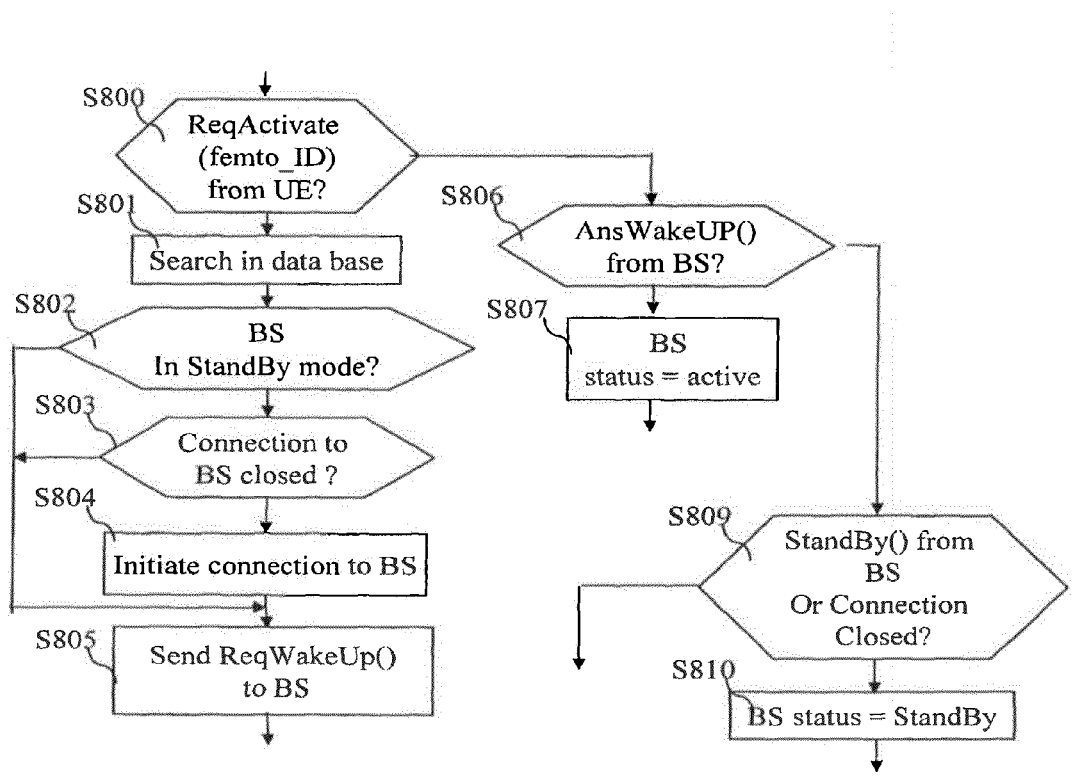
FIG. 8 depicts an algorithm executed by the base station which manages the cell in which the mobile is located according to a second mode of realisation of the present invention.
Figure 9:
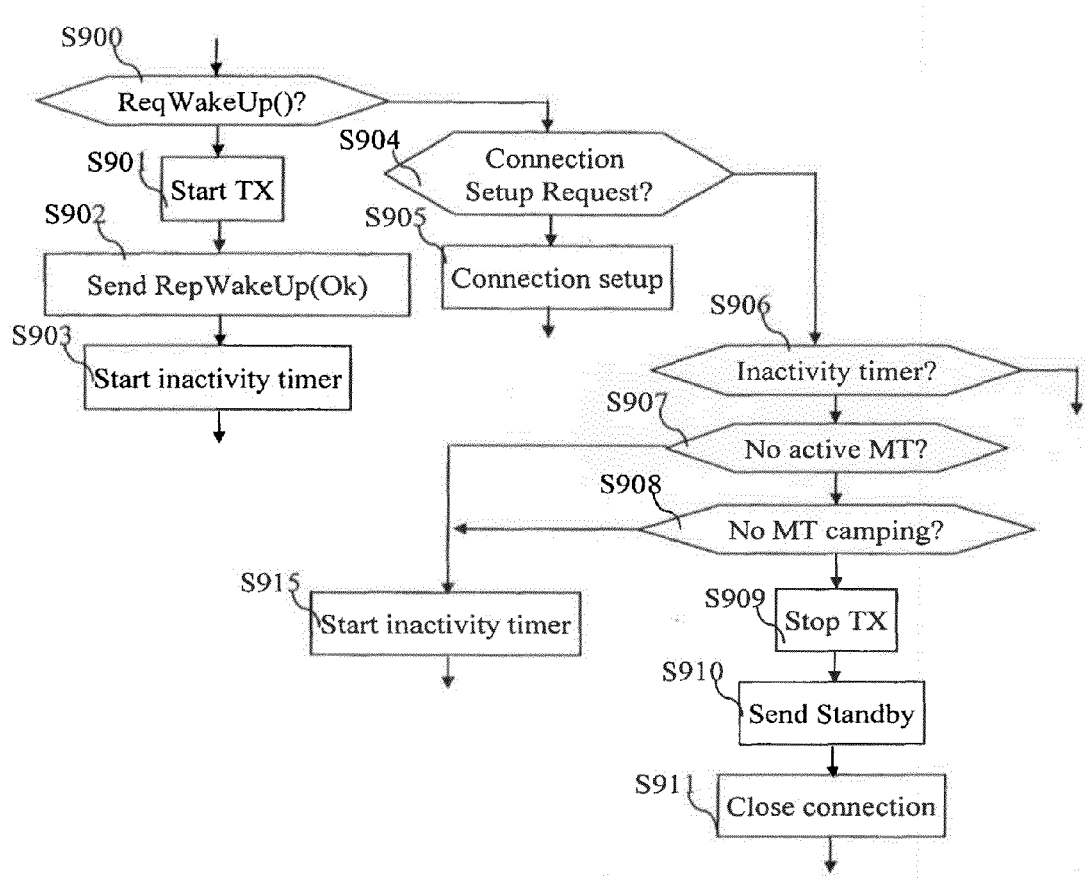
FIG. 9 depicts an algorithm executed by the base station which is or has been requested to transfer signals in its cell according to the present invention.

The memory 203 contains registers intended to receive variables, information identifying cells 15, like cells 15 which are known as neighbour of the cells 15 managed by the base station BS and the identifiers of the base stations BS which manage neighbour cells 15, connection and security information for each communication link with base stations BS which manage neighbour cells, connection and security information for the communication link with the server 10 and the instructions of the program related to the algorithm as disclosed in the FIG. 9 and the algorithm as disclosed in the FIG. 8 according to the second mode of realisation.

The processor 200 controls the operation of the network interface 204, the wireless interface 206 and according to a variant of realisation, the wireless receiver 207.

The read only memory 202 contains instructions of the programs related to the algorithm as disclosed in the FIG. 9 and the algorithm as disclosed in the FIG. 8 according to the second mode of realisation, which are transferred, when the base station BS is powered on to the random access memory 203.

The base station BS is connected to the telecommunication network through the network interface 204. As example, the network interface 204 is a DSL (Digital Subscriber Line) modem, or an ISDN (Integrated Services Digital Network) interface, etc.

Through such interface, the base station BS exchanges information with the server 10 and the other base stations BS of the wireless cellular telecommunication network through or not the proxy 50 according to the mode of realisation. The communications established or received by the mobile terminals MT comprised in each cell 15 managed by the base station BS go through the network interface 204 and the wireless interface 206.

The network interface 204 comprises means for establishing and releasing a communication link between the base station BS and the server 10 or between the base station BS and the proxy 50 or between the base station BS and other base stations BS. The means for establishing and releasing the communication links are distinct from each other or are common.

Through the wireless interface 206, the base station BS transfers monitoring lists of information identifying cells 15 and receives, from the mobile terminal MT, measurement reports.

The wireless interface 206 comprises means for enabling or disabling the transfer of signals by the base station BS in the cell 15 of the base station BS.

According to the variant of realisation, the wireless receiver 207 comprises means for detecting a predetermined signal transferred by at least one mobile terminal MT.

The predetermined signal is as example, a predetermined information like a predetermined signature, that is modulated in a frequency band different than the frequency band used for the uplink channel of the wireless cellular communication system. As example, and in a non limitative way, the predetermined signature is carried by a Bluetooth, a WiFi, a WiMAX or a ZigBee signal.

In another example, the predetermined information is a predetermined encoded train of energy pulses that are propagated by either radio or optical waves. As example, and in a non limitative way, the predetermined encoded train of energy pulses is an Infra-Red (IrDa) optical signal or a Ultra-wideband (UWB) radio signal.

Figure 3:
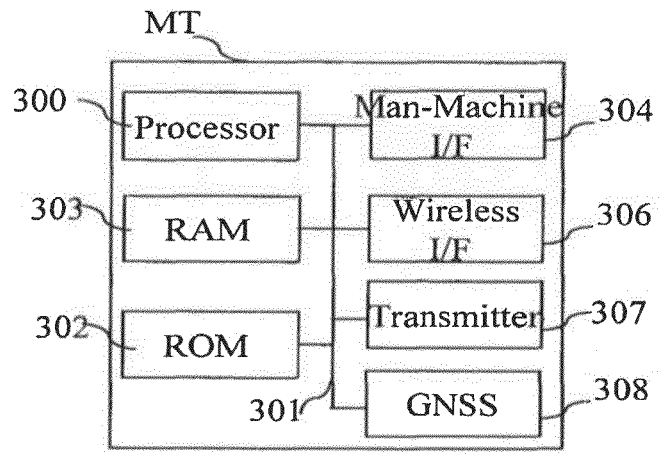
FIG. 3 is a block diagram of a mobile terminal according to the present invention.

FIG. 3 is a block diagram of a mobile terminal MT according to the present invention.

Figure 5:
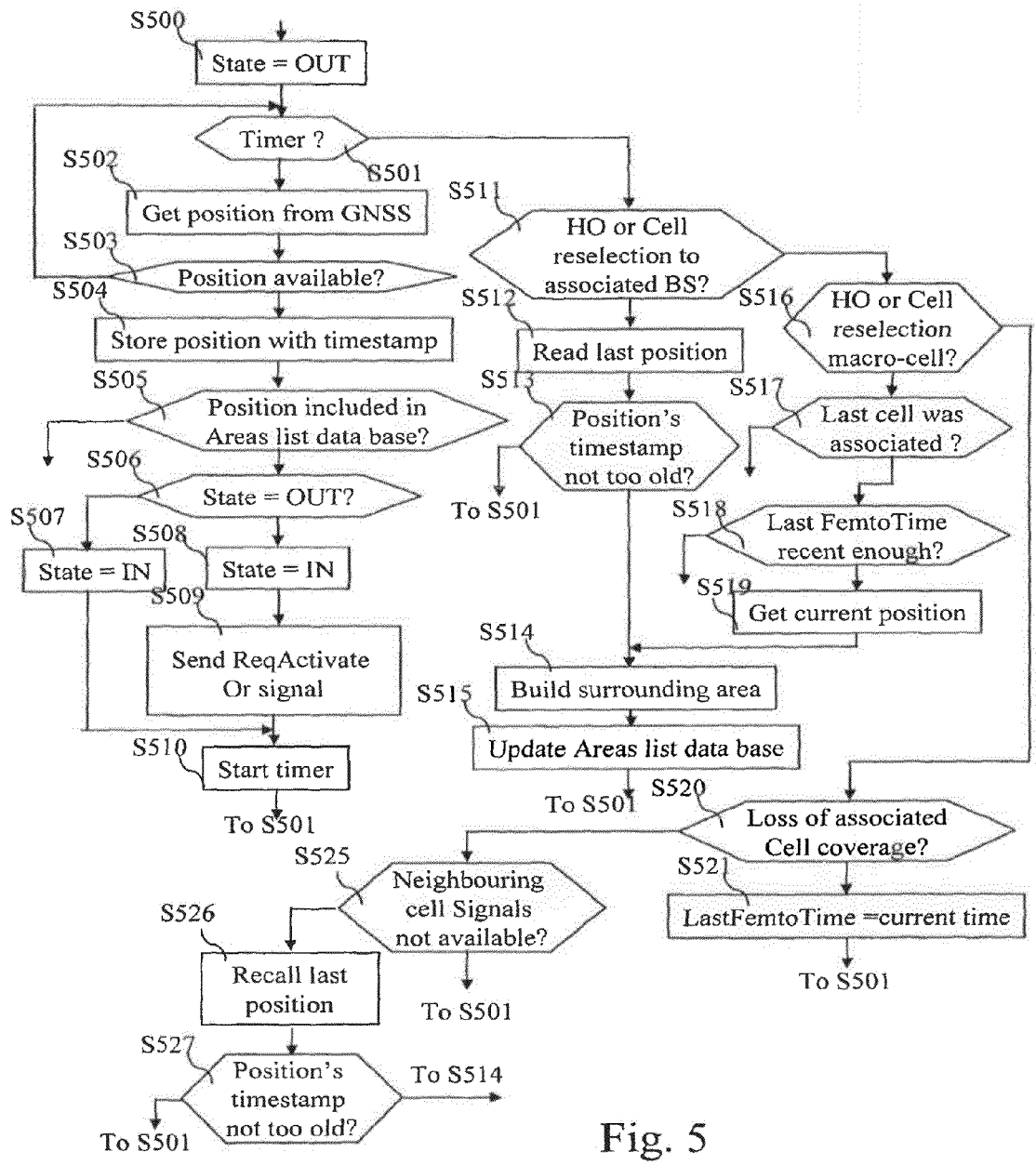
FIG. 5 depicts an algorithm executed by the mobile terminal when the mobile terminal comprises a global navigation satellite system.
Figure 6:
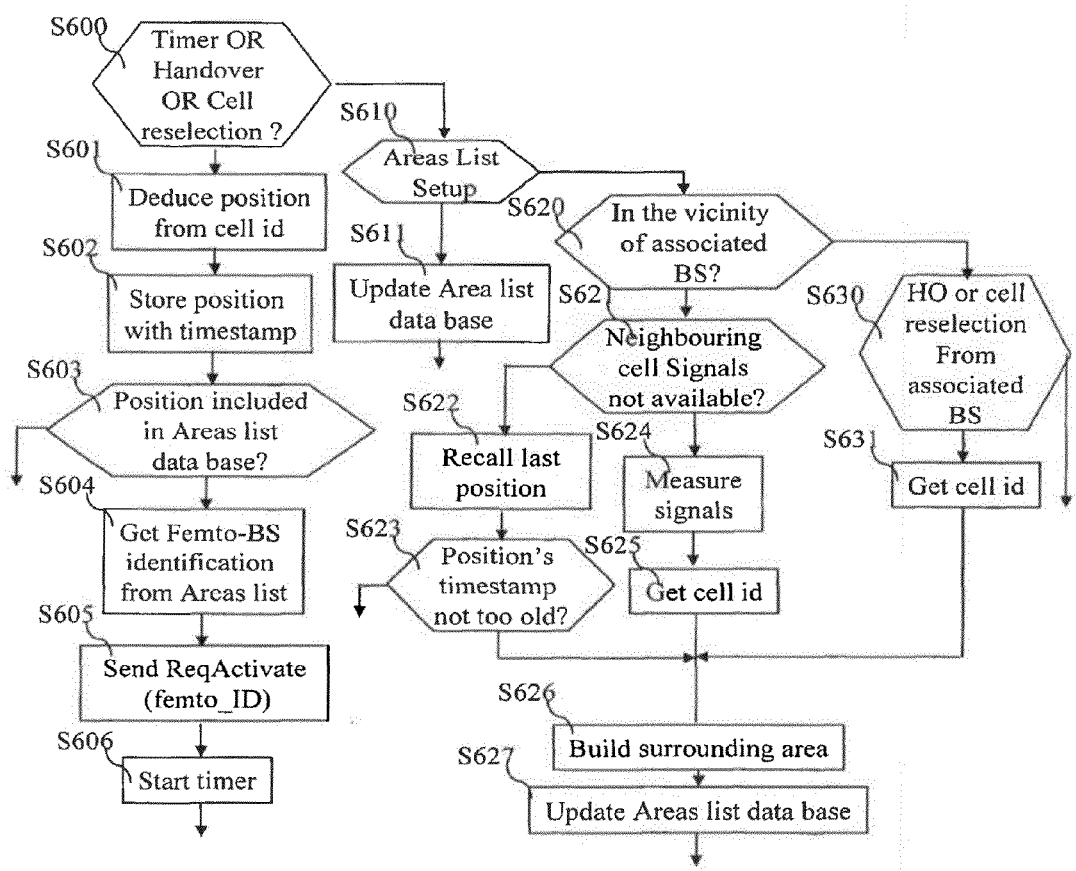
FIG. 6 depicts an algorithm executed by the mobile terminal when the mobile terminal doesn't comprise a global navigation satellite system.

Each mobile terminal MT has, for example, an architecture based on components connected together by a bus 301 and a processor 300 controlled by the programs as disclosed in FIG. 5 or 6.

The bus 301 links the processor 300 to a read only memory ROM 302, a random access memory RAM 303, a Man-Machine Interface 304, a wireless interface 306, eventually a Global Navigation Satellite System transceiver 308 and, according to a variant of realisation, a wireless transmitter 307.

The memory 303 contains registers intended to receive variables and the instructions of the program related to the algorithm as disclosed in FIG. 5 or 6.

The memory 303 comprises a data base information indicating, for each base station BS associated to the mobile terminal MT, a geographical area.

The geographical area of one base station BS associated to the mobile terminal MT is updated by memorizing information representative of the location of the mobile terminal MT in cells 15 of other base stations BS of the wireless cellular telecommunication network, the other base stations BS being base stations BS with which cell reselection or handover procedure has been executed by the mobile terminal MT from or to the cell 15 of the base station BS.

The processor 300 controls the operation of the Man-Machine Interface 304, the wireless interface 306 and, if there is one, the wireless transmitter 307.

The read only memory 302 contains instructions of the program related to the algorithm as disclosed in FIG. 5 or 6, which are transferred, when the mobile terminal MT is powered on to the random access memory 303.

The wireless interface 306 comprises means for detecting, measuring and receiving signals transferred by base stations BS through the downlink channel, and for transmitting signals or messages through the uplink channel of the wireless cellular communication system.

According to the variant, the wireless transmitter 307 comprises means for transferring a predetermined signal.

The predetermined signal is as example, a predetermined information like a predetermined signature, that is modulated in a frequency band different than the frequency band used for the uplink channel of the wireless cellular communication system. As example, and in a non limitative way, the predetermined signature is carried by a Bluetooth, a WiFi, a WiMAX or a ZigBee signal.

In another example, the predetermined information is a predetermined encoded train of energy pulses that are propagated by either radio or optical waves. As example, and in a non limitative way, the predetermined encoded train of energy pulses is an Infra-Red (IrDa) optical signal or a Ultra-wideband (UWB) radio signal.

The Man-Machine Interface 304 may be used by the user of the mobile terminal MT in order to indicate that a new location needs to be included in the geographical area of a base station BS associated to the mobile terminal MT.

Figure 4:
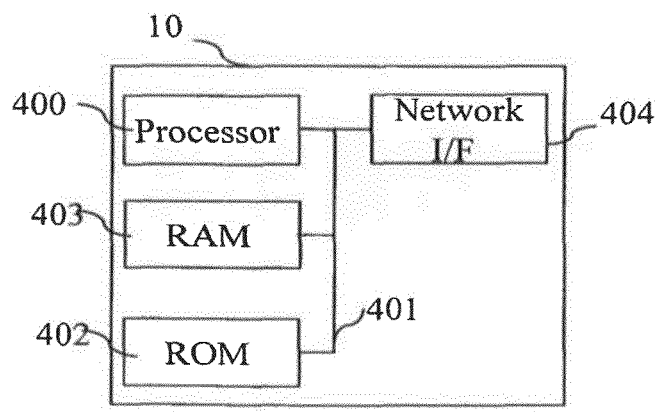
FIG. 4 is a block diagram of a server of the wireless cellular telecommunication network according to the present invention.

FIG. 4 is a block diagram of a server of the wireless cellular telecommunication network according to the present invention.

Figure 7:
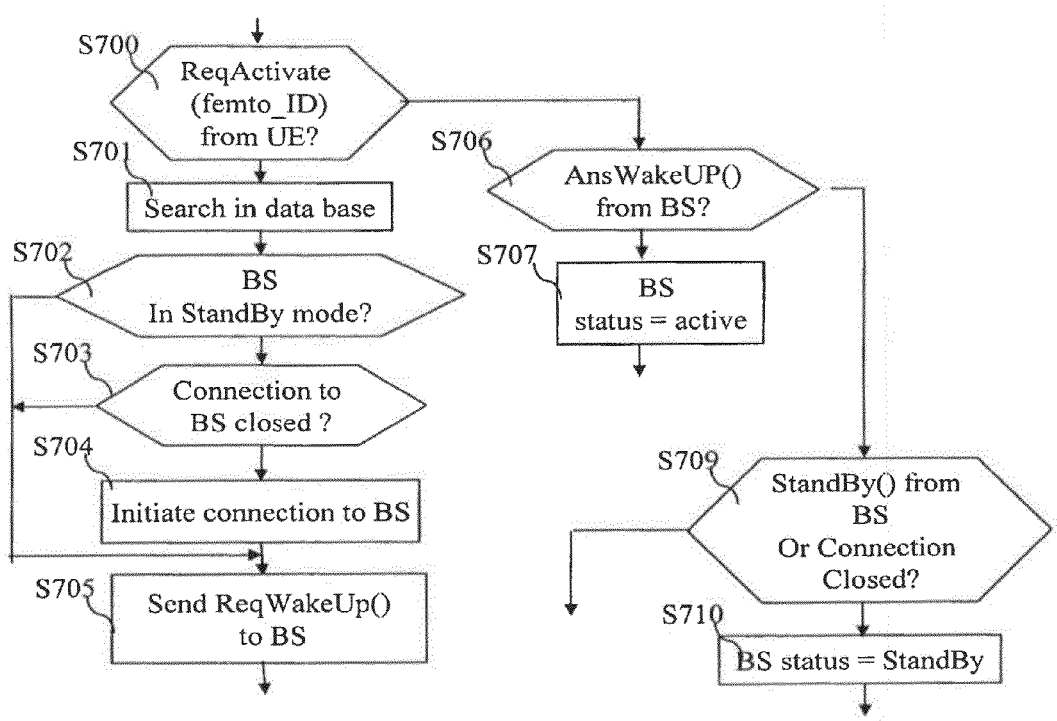
FIG. 7 depicts an algorithm executed by the server according to a first mode of realisation of the present invention.

The server 10 has, for example, an architecture based on components connected together by a bus 401 and a processor 400 controlled by the program as disclosed in the FIG. 7.

The bus 401 links the processor 400 to a read only memory ROM 402, a random access memory RAM 403 and a network interface 404.

The memory 403 contains registers intended to receive variables, information related to the base stations of the cellular telecommunication network. The server 10 stores a list of the base stations BS which are currently active, the list of mobile terminals MT which are associated to each base station BS, and for each base station BS, the list of base stations BS which are controlling one cell 15 neighbour to one cell 15 of the base station BS.

The memory 403 comprises a data base comprising, for each mobile terminal MT, information indicating each base station BS associated to the mobile terminal MT, and for each base station BS associated to the mobile terminal MT, a geographical area.

The processor 400 controls the operation of the network interface 404.

The read only memory 402 contains instructions of the programs related to the algorithm as disclosed in the FIG. 7, which are transferred, when the server 10 is powered on to the random access memory 403.

The server 10 is connected to the telecommunication network 50 through the network interface 404. As example, the network interface 404 is a DSL (Digital Subscriber Line) modem, or an ISDN (Integrated Services Digital Network) interface, etc. Through such interface, the network server 10 exchanges information with the base stations BS of the wireless cellular telecommunication network and receives, according to the preferred mode of realisation of the present invention, message from mobile terminals MT through the base stations BS which manage the cell 15 in which they are located.

FIG. 5 depicts an algorithm executed by the mobile terminal when the mobile terminal comprises a global navigation satellite system.

More precisely, the present algorithm is executed by the processor 300 of the mobile terminal MT.

At step S500, the processor 300 sets the variable named State at the value "OUT". The variable state indicates if the mobile terminal MT is located in the geographical area of a base station BS which is associated to the mobile terminal MT.

At next step S501, the processor 300 checks if a timer noted Timer expires.

The timer Timer enables the mobile terminal MT to proceed to some location determination at a predetermined periodicity.

If the timer Timer expires, the processor 300 moves to step S502. Otherwise, the processor 300 moves to step S511.

At step S502, the processor 300 gets, from the GNSS transceiver 308, the information representative of the location of the mobile terminal MT.

At step S503, the processor 300 checks if information representative of the location can be obtained. As example, when the mobile terminal MT is located in a building, it is difficult to receive satellite signals used for determining the location of the mobile terminal MT.

If no information representative of the location can be obtained, the processor 300 returns to step S501. Otherwise, the processor 300 moves to step S504.

At step S504, the processor 300 memorises the information representative of the location of the mobile terminal MT in the RAM memory 303 in combination with a timestamp.

At next step S505, the processor 300 checks if the location obtained at step S502 is comprised in a geographical area of a base station BS which is associated to the mobile terminal MT.

For that, the processor 300 reads the content of a list of areas, with at least one geographical area per base station BS which is associated to the mobile terminal MT. Each geographical area is representative of a zone around the base station BS which is associated to the mobile terminal MT. These zones can be defined by a rectangle with two coordinates, or by a circle with one coordinate and a radius, or by any combination able to define a surface in a two or three dimensions space, by a bowl including boundary points, the centre of the bowl being determined as the barycentre of boundary points.

If the location obtained at step S502 is comprised in a geographical area of one base station BS which is associated to the mobile terminal MT, the processor 300 moves to step S506. Otherwise, the processor 300 returns to step S500.

At step S506, the processor 300 checks if the variable State is equal to the value "OUT"

If the variable State is equal to the value "OUT", the processor 300 moves to step S508. Otherwise, the processor 300 moves to step S507.

At step S507, the processor 300 sets the variable State at the value "OUT". After that, the processor 300 moves to step S510.

At step S508, the processor 300 sets the variable State at the value "IN".

At next step S509, the processor 300, according to the first and second modes of realisation of the present invention, commands the transfer of a message noted ReqActivate, to the server 10 or to the base station BS which manages the mobile terminal MT indicating that the mobile terminal MT is located in the geographical area of a base station BS which is associated to the mobile terminal MT. The ReqActivate message comprises the identifier of the base station BS which is associated to the mobile terminal MT and which was identified at step S505 and/or information representative of the location of the mobile terminal MT.

The ReqActivate message is transferred, through the base station BS which is currently managing the cell 15 in which the mobile terminal MT is located or is transferred, through the base station BS which is currently managing the cell 15 in which the mobile terminal MT is located and through the proxy 50.

According to the variant of realisation, the processor 300 commands the transfer of the predetermined signal to the base station BS which is associated to the mobile terminal MT via the wireless transmitter 307.

At next step S510, the processor 300 activates the timer Timer.

After that, the processor 300 returns to step S501.

At step S511, the processor 300 checks if a handover or a cell reselection procedure has been executed from a base station BS to the base station BS which is associated to the mobile terminal MT.

A cell reselection procedure is executed when signals identifying a cell 15 are stronger than the signals identifying the current cell 15 selected by the mobile terminal MT. The signals are transferred into at least one frequency band and are detected after scanning the at least one frequency band. A handover procedure is executed when the communication of a mobile terminal MT, which is currently under communication with a remote communication device through a base station BS, is continued through another base station BS.

If a handover or a cell reselection procedure has been conducted from a base station BS to the base station BS which is associated to the mobile terminal MT, the processor 300 moves to step S512. Otherwise, the processor 300 moves to step S516.

At step S512, the processor 300 reads the last memorized information representative of the location of the mobile terminal MT in the RAM memory 303 in combination with a timestamp.

At next step S513, the processor 300 checks if the timestamp read at step S512 is not too old. As example, a timestamp is too old when the difference between the current time and the timestamp is upper than a predetermined threshold upper than 10 seconds.

If the timestamp read at step S512 is too old, the processor 300 returns to step S501. Otherwise, the processor 300 moves to step S514.

At step S514, the processor 300 builds a surrounding area. As example, the processor 300 builds a circle with the read location as a center and a radius. As other example, the processor 300 adds the location of the mobile terminal. MT to a set of location of boundary points, computes a new centre point, a new radius and builds a circle with the centre and radius.

At next step S515, the processor 300 updates the list of areas disclosed at step S505 by including the surrounding area in it.

After that, the processor 300 returns to step S501.

At step S516, the processor 300 checks if a handover or a cell reselection procedure has been conducted from a base station BS which is associated to the mobile terminal MT to a base station BS which is not associated to the mobile terminal MT.

If a handover or a cell reselection procedure has been conducted from a base station BS which is associated to the mobile terminal MT to a base station BS which is not associated to the mobile terminal MT, the processor 300 moves to step S517. Otherwise, the processor 300 moves to step S520.

At step S517, the processor 300 checks if the base station BS managing the cell 15 in which the mobile terminal MT was located prior to the cell reselection or the handover is a base station BS which is associated to the mobile terminal MT.

If the base station BS managing the cell 15 in which the mobile terminal MT was located prior to the cell reselection or the handover is a base station BS which is associated to the mobile terminal MT, the processor 300 moves to step S518. Otherwise, the processor 300 returns to step S501.

At step S518, the processor 300 checks if the variable noted FemtoTime is recent enough.

As example, the variable FemtoTime is recent if the difference between the current time and the variable FemtoTime is upper than a predetermined threshold upper than 10 seconds.

If the variable noted FemtoTime is recent enough, the processor 300 moves to step S519. Otherwise, the processor 300 returns to step S501.

At step S519, the processor 300 reads the last memorized information representative of the location in the RAM memory 303.

After that, the Processor 300 Moves to Step S514 Already Described.

At step S520, the processor 300 checks if the mobile terminal MT is covered by the cell 15 of the base station BS which is associated to the mobile terminal MT.

If the mobile terminal MT is covered by the cell 15 of the base station BS which is associated to the mobile terminal MT, the processor 300 moves to step S521. Otherwise, the processor 300 moves to step S525.

At step S521, the processor 300 sets the variable LastFemtoTime to the current time.

After that, the processor 300 returns to step S501.

At step S525, the processor 300 checks if signals identifying a cell 15 other than the cell managed by the base station BS associated to the mobile terminal MT are detected.

If they are some signals identifying a cell 15 other than the cell 15 managed by the base station BS associated to the mobile terminal MT are detected, the processor 300 returns to step S501.

If they are no signals identifying a cell 15 other than the cell 15 managed by the base station BS associated to the mobile terminal MT are detected, the processor 300 moves to step S526.

At step S526, the processor 300 reads the last location memorized at step S504 and the associated timestamp.

At next step S527, the processor 300 checks if the timestamp read at step S526 is not too old. As example, a timestamp is too old when the difference between the current time and the timestamp is upper than a predetermined threshold upper than 10 seconds.

If the timestamp read at step S526 is too old, the processor 300 returns to step S501. Otherwise, the processor 300 moves to step S514 already disclosed.

FIG. 6 depicts an algorithm executed by the mobile terminal when the mobile terminal doesn't comprise a global navigation satellite system.

More precisely, the present algorithm is executed by the processor 300 of the mobile terminal MT At step S600, the processor 300 of the mobile terminal MT checks if a timer noted Timer expires or if a handover or a cell reselection procedure has been conducted.

If the timer Timer expires or if a handover or a cell reselection procedure has been conducted, the processor 300 moves to step S601. Otherwise, the processor 300 moves to step S610.

At step S601, the processor 300 deduces the mobile terminal MT current location using the cell identifier of the base station BS which manages the newly selected cell 15.

At step S602, the processor 300 memorises the information representative of the location, i.e. the cell identifier, in the RAM memory 303 in combination with a timestamp. As other example, the information representative of the location contains time of arrival and/or angle of arrival of signals received from multiple surrounding base stations BS.

At next step S603, the processor 300 checks if the location obtained at step S601 is comprised in a geographical area of a base station BS which is associated to the mobile terminal MT.

For that, the processor 300 checks if the cell identifier memorised at step S602 is comprised in a list of area associated to the base station BS or base stations BS which is or are associated to the mobile terminal MT.

If the location obtained at step S601 corresponds to a geographical area of a base station BS which is associated to the mobile terminal MT, the processor 300 moves to step S604.

Otherwise, the processor 300 returns to step S600.

At step S604, the processor 300 gets the identifier of the base station BS which is associated to the mobile terminal MT and to the geographical area in which the location of the mobile terminal MT is comprised as determined in step S603.

At next step S605, the processor 300 commands the transfer to the server 10 or the base station BS which manages the mobile terminal MT of a predetermined message noted ReqActivates which comprises the identifier of the base station BS obtained at step S604 and/or information representative of the location of the mobile terminal MT.

The ReqActivate message is transferred, through the base station BS which is currently managing the cell 15 in which the mobile terminal MT is located or is transferred, through the base station BS which is currently managing the cell 15 in which the mobile terminal MT is located and through the proxy 50.

In a variant of realisation, the processor 300 commands the transfer to the base station BS of a predetermined signal via the transmitter 307.

At next step S606, the processor 300 activates the timer Timer.

After that, the processor 300 returns to step S600.

At step S610, the processor 300 checks if the list of areas needs to be set up. The list of areas needs to be setup upon human action on the Man Machine Interface 304.

If the list of areas needs to be set up, the processor 300 moves to step S611. Otherwise, the processor 300 moves to step S620.

At step S611, the processor 300 updates the list of areas by including the cell 15 in which the mobile terminal MT is located, or by adding the location of the mobile terminal MT in the set of boundary points of the geographical area, or by adding at least one location indicated by the Man Machine Interface in the list of boundary points of the geographical area. After that, the processor 300 returns to step S600.

At step S620, the processor 300 checks if the mobile terminal MT is in the cell 15 of a base station BS which is associated to the mobile terminal MT.

If the mobile terminal MT is covered by a base station BS which is associated to the mobile terminal MT, the processor 300 moves to step S621. Otherwise, the processor 300 moves to step S630.

At step S621, the processor 300 checks if signals identifying a cell 15 other than the cell 15 managed by the base station BS associated to the mobile terminal MT are detected.

If they are some signals, identifying a cell 15 other than the cell 15 managed by the base station BS associated to the mobile terminal MT, are detected, the processor 300 moves to step S624.

If they are no signals, identifying a cell 15 other than the cell 15 managed by the base station BS associated to the mobile terminal MT, are detected, the processor 300 moves to step S622.

At step S622, the processor 300 reads the last location memorized at step S602 and the associated timestamp.

At next step S623, the processor 300 checks if the timestamp read at step S622 is not too old. As example, a timestamp is too old when the difference between the current time and the timestamp is upper than a predetermined threshold upper than 10 seconds.

If the timestamp read at step S622 is too old, the processor 300 returns to step S600. Otherwise, the processor 300 moves to step S626.

At step S624, the processor 300 gets signals identifying cells 15 broadcasted by the base station BS which is associated to the mobile terminal MT.

At next step S625, the processor 300 gets the identifiers of cells 15 corresponding to the signals obtained at step S624.

At next step S626, the processor 300 builds a surrounding area. As example, the processor 300 gets the identifiers of base stations BS or cells 15 reads at step S622 or obtained at step S625 or S631.

At next step S627, the processor 300 updates the list of areas by including the identifiers obtained at step S626.

After that, the processor 300 returns to step S600.

At step S630, the processor 300 checks if a handover or a cell reselection procedure has been executed from a base station BS which is associated to the mobile terminal MT to another base station BS.

If no handover or no cell reselection procedure has been executed from a base station BS which is associated to the mobile terminal MT to another base station BS, the processor 300 returns to step S600.

If a handover or a cell reselection procedure has been executed from a base station BS which is associated to the mobile terminal MT to another base station BS, the processor 300 moves to step S631.

At next step S631, the processor 300 gets the identifiers of cell 15 of the other base station BS.

After that, the processor 300 moves to step S626 already described.

FIG. 7 depicts an algorithm executed by the server according to a first mode of realisation of the present invention.

More precisely, the present algorithm is executed by the processor 400 of the server 10.

At step S700, the processor 400 checks if a ReqActivate message is received from a mobile terminal MT. A ReqActivate message indicates that the mobile terminal MT is located in the geographical area of a base station BS which is associated to the mobile terminal MT. The ReqActivate message may comprise the identifier of the base station BS which is associated to the mobile terminal MT or information representative of the location of the mobile terminal.

If a ReqActivate message is received, the processor 400 moves to step S701. Otherwise, the processor 400 moves to step S706.

In a variant of realisation, the processor 400 maintains a list of areas for each mobile terminal MT, executes the steps S505 to S508 of the FIG. 5, and determines as it has been disclosed in the FIG. 5, that the mobile terminal MT is located in the geographical of a base station BS which is associated to the mobile terminal MT.

In another variant, the processor 400 receives a message transferred by the mobile terminal MT through a base station BS which is neighbour of the base station BS associated to the mobile terminal MT. The message can be a Handover request message, or a Tracking. Area Update message, or any other S1-AP or NAS (Non Access Stratum, exchanged between mobile terminal MT and server 10 via base station BS or via the base station BS and the proxy 50) message provided by the base station BS to the server 10.

At step S701, the processor 400 consults a database using the identifier of the base station BS which is associated to the mobile terminal MT as a key, in order to know if the identified base station BS transfers or not signals in the cell 15 that the base station BS manages.

It has to be noted here that, if there is only a single base station BS which is associated to the mobile terminal MT, the identifier of that base station BS doesn't need to be included in the ReqActivate message.

At next step S702, the processor 400 checks if the identified base station BS transfers signals in the cell 15 that the base station BS manages.

If the identified base station BS transfers signals in the cell 15 that the base station BS manages, the processor 400 moves to step S705. Otherwise, the processor 400 moves to step S703.

At step S703, the processor 400 checks if a communication link with the identified base station BS is closed or not.

A communication link, as example the communication link between the server 10 and the base station BS1 is closed, if the communication link 25₁ is released.

If the communication link is closed, the processor 400 moves to step S704. Otherwise, the processor 400 moves to step S705.

At step S704, the processor 400 commands the establishment of a communication link with the identified base station BS.

For that, the processor 400 reads in the RAM memory 403, connection and security parameters and commands the network interface 404 in order to establish a communication link with the identified base station BS with the read parameters. The processor 400 commands the transfer of a list comprising information identifying the base stations BS managing neighbour cells 15 of the cell 15 of the identified base station BS and which are currently transferring signals into the respective cells 15 they are managing.

At next step S705, the processor 400 commands the transfer of a predetermined message noted ReqWakeup( ) to the identified base station BS.

That message requests the base station BS to transfer signals in the cell 15 managed by the base station BS.

After that, the processor 400 returns to step S700.

At step S706, the processor 400 checks if a message noted AnsWakeUP( ) is received from a base station BS. The message AnsWakeUP( ) informs that the base station BS transfers signals in the cell 15 that the base station BS manages.

If a message AnsWakeUP( ) is received, the processor 400 moves to step S707. Otherwise, the processor 400 moves to step S709.

At step S707, the processor 400 sets the status of the base station BS which sent the message AnsWakeUP( ) to active in the database.

After that, the processor 400 returns to step S700.

At step S709, the processor 400 checks if a message noted StandBy( ) is received from a base station BS or if a connexion between the server 10 and a base station BS is closed. The message StandBy( ) informs that the base station BS disables the transfer of signals in the cell 15 that the base station BS manages.

If a message noted StandBy( ) is received from a base station BS or if a connexion between the server 10 and a base station BS is closed, the processor 400 moves to step S710. Otherwise, the processor 400 returns to step S700.

At step S710, the processor 400 sets in the status of the base station BS which sent the message AnsWakeUP( ) to standby in the data base.

After that, the processor 400 returns to step S700.

FIG. 8 depicts an algorithm executed by the base station which manages the cell in which the mobile terminal is located according to a second mode of realisation of the present invention.

More precisely, the present algorithm is executed by the processor 200 of the base station BS which manages the cell 15 in which the mobile terminal MT is located.

At step S800, the processor 200 checks if a ReqActivate message is received from a mobile terminal MT. A ReqActivate message indicates that the mobile terminal MT is located in the geographical area of a base station BS which is associated to the mobile terminal MT. The ReqActivate message may comprise the identifier of the base station BS which is associated to the mobile terminal MT or information representative of the location of the mobile terminal.

If a ReqActivate message is received, the processor 200 moves to step S801. Otherwise, the processor 200 moves to step S806.

At step S801, the processor 200 consults a database using the identifier of the base station BS which is associated to the mobile terminal MT as a key, in order to know if the identified base station BS transfers or not signals in the cell 15 that the base station BS manages.

It has to be noted here that, if there is only a single base station BS which is associated to the mobile terminal MT, the identifier of that base station BS doesn't need to be included in the ReqActivate.

At next step, the processor 200 checks if the identified base station BS transfers signals in the cell 15 that the base station BS manages.

If the identified base station BS transfers signals in the cell 15 that the base station BS manages, the processor 200 moves to step S805. Otherwise, the processor 200 moves to step S803.

At step S803, the processor 200 checks if a communication link with the identified base station BS is closed or not.

A communication link, as example the communication link between the base station BS2 and the base station BS1 is closed, if the communication link $35_{2a}$ is released or if the communication link $35_2$ is released.

If the communication link is closed, the processor 200 moves to step S804. Otherwise, the processor 200 moves to step S805.

At step S804, the processor 200 commands the establishment of a communication link with the identified base station BS.

For that, the processor 200 reads in the RAM memory 203, connection and security parameters and commands the network interface 204 in order to establish a communication link with the identified base station BS with the read parameters.

When the communication link is via a proxy, the proxy 50 establishes a communication link with the identified base station BS.

At next step S805, the processor 200 commands the transfer of a predetermined message noted ReqWakeup( ) to the identified base station BS.

That message requests the base station BS to transfer signals in the cell 15 managed by the base station BS.

After that, the processor 200 returns to step S800.

At step S806, the processor 200 checks if a message noted AnsWakeUP( ) is received from a base station BS. The message AnsWakeUP( ) informs that the base station BS transfers signals in the cell 15 that the base station BS manages.

If a message AnsWakeUP( ) is received, the processor 200 moves to step S807. Otherwise, the processor 200 moves to step S809.

At step S807, the processor 200 sets the status of the base station BS which sent the message AnsWakeUP( ) to active in the database.

After that, the processor 200 returns to step S800.

At step S809, the processor 200 checks if a message noted StandBy( ) is received from a base station BS or if a connexion between the base station BS and another base station BS is closed. The message StandBy( ) informs that the other base station BS disables the transfer of signals in the cell 15 that the other base station. BS manages.

If a message noted StandBy( ) is received from another base station BS or if a connexion between the other base station BS and the base station BS is closed, the processor 200 moves to step S810. Otherwise, the processor 200 returns to step S800.

At step S810, the processor 200 sets in the status of the other base station BS which sent the message AnsWakeUP( ) to standby in the data base.

After that, the processor 200 returns to step S800.

FIG. 9 depicts an algorithm executed by the base station which is or has been requested to transfer signals in its cell according to the present invention.

More precisely, the present algorithm is executed by the processor 200 of the base station BS.

At step S900, the processor 200 checks if a predetermined message is received.

According to the first and second modes of realisation, the predetermined message is transferred by the server 10 or by a neighbour base station BS and is a ReqWakeUp( ) message as disclosed at step S705 of the FIG. 7 or at step S805 of the FIG. 8.

In a variant, the message is a predetermined signal transferred by the mobile terminal MT as disclosed at step S509 of the FIG. 5 or at step S605 of the FIG. 6.

If a predetermined message is received, the processor 200 moves to step S901. Otherwise, the processor 200 moves to step S904.

At step S901, the processor 200 command the wireless interface 206 in order to enable the transfer of signals in the cell 15 of the base station BS.

At next step S902, the processor 200 commands the transfer of a message noted AnsWakeUP( ) to the server 10 according to the first mode of realisation or to each neighbour base station BS according to the second mode of realisation. The message AnsWakeUP( ) informs that the base station BS transfers signals in the cell 15 that the base station BS manages.

At next step S903, the processor 200 activates a timer noted inactivity.

After that, the processor 200 returns to step S900.

At step S904, the processor 200 checks if a communication link is requested to be established by the server 10 or by the proxy 50.

If a communication link is requested to be established, processor 200 moves to step S905. Otherwise, the processor 200 moves to step S906.

At step S905, the processor 200 commands the establishment of a communication link with the server 10 or with the proxy 50.

For that, the processor 200 reads in the RAM memory 203 connection and security parameters and commands the network interface 204 in order to establish a communication link with the server 10 or with the proxy 50 with the read parameters. The processor 200 receives through the establish link a list comprising information identifying the base stations BS managing neighbour cells of the cell 15 of the base station BS and which are currently transferring signals into the respective cells 15 they are managing.

The processor 200 commands the establishment of a communication link with each of the base stations BS identified in the list through or not the proxy 50 according to the different modes of realisation.

After that, the processor 200 returns to step S900.

At step S906, the processor 200 checks if the timer inactivity is expired.

If the timer inactivity is expired, the processor 200 moves to step S907. Otherwise, the processor 200 returns to step S900.

At step S907, the processor 200 checks if there are some mobile terminals MT which are currently active, i.e. which are currently involved in a communication, in the cell 15 managed by the base station BS.

If there is no mobile terminal MT which is currently active in the cell 15 managed by the base station BS, the processor 200 moves to step S908. Otherwise, the processor 200 moves to step S915.

At step S915, the processor 200 re starts the timer inactivity.

After that, the processor 200 returns to step S900.

At step S908, the processor 200 checks if there are some mobile terminals MT which are currently camping, i.e. which are not currently involved in a communication, in the cell 15 managed by the base station BS.

If there is no mobile terminal MT which is currently located in the cell 15 managed by the base station BS, the processor 200 moves to step S909. Otherwise, the processor 200 moves to step S915.

At step S909, the processor 200 commands the wireless interface 206 in order to disable the transfer of signals in the cell 15 managed by the base station BS.

At next step S910, the processor 200 commands the transfer of a message noted StandBy( ) to the server 10 or to each neighbour base station BS. The message StandBy( ) informs that the base station BS disables the transfer of signals in the cell 15 that the base station BS manages.

At next step S911, the processor 200 commands to release of the connexion between the server 10 and the base station BS or between the base station BS and the proxy 50. The processor 200 commands to release of each connexion between each neighbour base station BS and the base station BS or between the base station BS and the proxy 50.

After that, the processor 200 returns to step S900.

Naturally, many modifications can be made to the embodiments of the invention described above without departing from the scope of the present invention.

The invention claimed is:

1. A method for enabling a mobile terminal to be detected by a first base station of a wireless cellular telecommunication network wherein the first base station is in a state wherein the first base station does not transfer signal in the cell of the first base station, the wireless cellular telecommunication network comprising a server and at least a second base station, the first base station being associated to the mobile terminal and in that the method comprises the steps, executed by the server or the second base station, of:
    receiving from the mobile terminal a message comprising information representative of a location of the mobile terminal in a geographical area of the first base station, the message comprising at least one identifier of the first base station which is associated to the mobile terminal,
    transferring a predetermined signal if the location of the mobile terminal is comprised in the geographical area of the first base station if the first base station does not transfer signals in its cell, the predetermined signal being representative of a request to the first base station to start to transfer signals in the cell of the first base station.

2. The method according to claim 1, wherein the information representative of the location of the mobile terminal is obtained by the second base station from a message generated by the mobile terminal and received by the second base station.

3. The method according to claim 2, wherein prior to the transfer of the predetermined signal to the first base station, the method comprises the step of establishing a communication link between the first base station and the second base station.

4. The method according to claim 3, wherein the information representative of the location of the mobile terminal is obtained from a Global Navigation Satellite System.

5. The method according to claim 3, wherein the information representative of the location of the mobile terminal is obtained from at least one identifier of at least one base station of the wireless cellular telecommunication network.

6. A non-transitory medium storing a computer program which can be directly loadable into a programmable device, comprising instructions or portions of code for implementing the steps of the method according to claim 3, when said computer program is executed on a programmable device.

7. The method according to claim 2, wherein the information representative of the location of the mobile terminal is obtained from a Global Navigation Satellite System.

8. The method according to claim 2, wherein the information representative of the location of the mobile terminal is obtained from at least one identifier of at least one base station of the wireless cellular telecommunication network.

9. A non-transitory medium storing a computer program which can be directly loadable into a programmable device, comprising instructions or portions of code for implementing the steps of the method according to claim 2, when said computer program is executed on a programmable device.

10. The method according to claim 1, wherein the information representative of the location of the mobile terminal is obtained from a Global Navigation Satellite System.

11. A non-transitory medium storing a computer program which can be directly loadable into a programmable device, comprising instructions or portions of code for implementing the steps of the method according to claim 10, when said computer program is executed on a programmable device.

12. The method according to claim 1, wherein the information representative of the location of the mobile terminal is obtained from at least one identifier of at least one base station of the wireless cellular telecommunication network.

13. The method according to claim 12, wherein the geographical area of one first base station associated to the mobile terminal is updated by memorizing information representative of the location of the mobile terminal in cells of other base stations of the wireless cellular telecommunication network, the other base stations being base stations with which cell reselection or handover procedure has been executed by the mobile terminal from or to the cell of the other base stations.

14. The method according to claim 13, wherein the location of the mobile terminal is time stamped and that the location of the mobile terminal is used to update the geographical area of one first base station associated to the mobile terminal if the location of mobile terminal is recent enough at the time the cell selection or the handover procedure is executed by the mobile terminal from or to the cell of the other base station.

15. A non-transitory medium storing a computer program which can be directly loadable into a programmable device, comprising instructions or portions of code for implementing the steps of the method according to claim 14, when said computer program is executed on a programmable device.

16. A non-transitory medium storing a computer program which can be directly loadable into a programmable device, comprising instructions or portions of code for implementing the steps of the method according to claim 12, when said computer program is executed on a programmable device.

17. A non-transitory medium storing a computer program which can be directly loadable into a programmable device, comprising instructions or portions of code for implementing the steps of the method according to claim 13, when said computer program is executed on a programmable device.

18. A non-transitory medium storing a computer program which can be directly loadable into a programmable device, comprising instructions or portions of code for implementing the steps of the method according to claim 1, when said computer program is executed on a programmable device.

19. A device for enabling a mobile terminal to be detected by a first base station of a wireless cellular telecommunication network wherein the first base station is in a state wherein the first base station does not transfer signal in the cell of the first base station, the wireless cellular telecommunication network comprising a server and at least a second base station, the first base station being associated to the mobile terminal and in that the device is included in the server or the second base station and comprises:
- means for receiving from the mobile terminal a message comprising information representative of a location of the mobile terminal in a geographical area of the first base station, the message comprising at least one identifier of the first base station which is associated to the mobile terminal,
- means for transferring a predetermined signal if the location of the mobile terminal is comprised in the geographical area of the first base station if the first base station does not transfer signals in its cell, the predetermined signal being representative of a request to the first base station to start to transfer signals in the cell of the first base station.

20. A wireless cellular telecommunication network comprising the device according to claim 19, wherein the network comprises a proxy through which the predetermined signal is transferred to the first base station.

* * * * *